United States Patent
Lee et al.

(10) Patent No.: US 7,826,005 B2
(45) Date of Patent: Nov. 2, 2010

(54) LIGHT SOURCE SUPPORTING MEMBER, DISPLAY DEVICE COMPRISING THE SAME AND METHOD THEREOF

(75) Inventors: Sang-hyeok Lee, Cheonan-si (KR); Yong-il Kim, Suwon-si (KR); Sang-sun Han, Cheonan-si (KR); Jae-min Choi, Asan-si (KR); Dong-wook Kim, Seoul (KR); Young-nam Kim, Anseong-si (KR)

(73) Assignee: Samsung Electronics Co., Ltd. (KR)

( * ) Notice: Subject to any disclaimer, the term of this patent is extended or adjusted under 35 U.S.C. 154(b) by 970 days.

(21) Appl. No.: 11/619,237

(22) Filed: Jan. 3, 2007

(65) Prior Publication Data

US 2007/0153154 A1 Jul. 5, 2007

(30) Foreign Application Priority Data

Jan. 3, 2006 (KR) .................... 10-2006-0000639

(51) Int. Cl.
*G02F 1/1335* (2006.01)
*G02F 1/1333* (2006.01)
*F21V 33/00* (2006.01)

(52) U.S. Cl. ........................... 349/64; 349/58; 349/61; 362/561; 362/97.2

(58) Field of Classification Search .................. 349/64, 349/61–62, 58; 362/561, 97.2, 581
See application file for complete search history.

(56) References Cited

U.S. PATENT DOCUMENTS

| 7,070,313 B2 * | 7/2006 | Kim et al. ................... 362/561 |
| 7,192,149 B2 * | 3/2007 | Lai ............................. 362/29 |
| 2007/0070652 A1 * | 3/2007 | Takata et al. ................ 362/655 |

* cited by examiner

*Primary Examiner*—David Nelms
*Assistant Examiner*—W. Patty Chen
(74) *Attorney, Agent, or Firm*—Cantor Colburn LLP

(57) ABSTRACT

A display device includes a liquid crystal display panel, a light source unit and a housing accommodating the light source unit. The light source unit includes a light source part and a light source supporting member supporting the light source part. The housing includes an insertion accommodating part provided in a bottom surface of the housing. The light source supporting member includes a planar main body, a light source holder and an insertion part protruding from the main body toward the housing to be coupled to the insertion accommodating part. The insertion part includes an engagement part and a connecting part. The insertion part is inserted in the insertion accommodating part and the light source supporting member is rotated at a predetermined angle.

29 Claims, 9 Drawing Sheets

LIGHT SOURCE SUPPORTING MEMBER, DISPLAY DEVICE COMPRISING THE SAME AND METHOD THEREOF

This application claims priority to Korean Patent Application No. 2006-0000639, filed on Jan. 3, 2006, and all the benefits accruing therefrom under 35 U.S.C. §119, the contents of which is incorporated herein by reference in its entirety.

BACKGROUND OF THE INVENTION

1. Field of Invention

The present invention relates to a light source supporting member and a display device including the same, and more particularly, a light source supporting member that can be simply assembled and is highly impact-resistant, and a display device including the same.

2. Description of the Related Art

As a substitute for a conventional CRT (cathode ray tube), a flat panel display device such as an LCD (liquid crystal display) device, a PDP (plasma display panel), an OLED (organic light emitting diode), etc. has been under development.

The LCD device includes an LCD panel provided with a TFT (thin film transistor) substrate, a color filter substrate, and a liquid crystal layer interposed therebetween. Since the LCD panel is a non-emissive element, the LCD device includes a backlight unit disposed behind the TFT substrate for supplying light to the LCD panel. The amount of light transmitted through the LCD panel is adjusted according to the orientation of liquid crystals in the liquid crystal layer.

The backlight unit is classified into a direct-light type in which a light source part is disposed in the rear side of the LCD panel to emit light thereto, and an edge-light type in which a light guide plate is provided behind the liquid crystal panel and a light source part is disposed in at least one side of the light guide plate to supply light to the LCD panel through the light guide plate. In comparison with the edge-light type, the direct-light type has an inferior light uniformity and an inferior durability. However, the direct-light type operates a plurality of light source parts in parallel, thereby to allow highly efficient use of light. Accordingly, the direct-light type is mainly applied to a large-sized LCD device that requires high brightness.

A direct-light type-backlight unit includes a light source supporting member for stably supporting a plurality of light source parts. The light source supporting member includes a main body, an insertion part protruding from the main body toward a housing and a light source holder supporting a light source part. The insertion part is forcedly fitted to a coupling groove provided to the housing to be coupled thereto.

However, to stably couple the insertion part to the coupling groove, the insertion part is manufactured to have a size larger than that of the coupling groove. Accordingly, it is difficult for the insertion part to be smoothly coupled to the coupling groove, thereby deteriorating an assembly thereof.

BRIEF SUMMARY OF THE INVENTION

An exemplary embodiment provides a light source supporting member that can be simply assembled and is highly impact-resistant and a display device including the same.

In an exemplary embodiment, a display device includes a liquid crystal display panel, a light source unit disposed behind the liquid crystal display panel and a housing accommodating the light source unit. The light source unit includes a light source part supplying light to the liquid crystal display panel and a light source supporting member supporting the light source part. The housing includes an insertion accommodating part having a non-circular section being provided in a bottom surface of the housing. The light source supporting member includes a planar main body, a light source holder extending from the main body toward the light source part to support the light source part, and an insertion part protruding from the main body toward the housing to be coupled to the insertion accommodating part. The insertion part includes an engagement part corresponding to the insertion accommodating part, and a connecting part connecting the engagement part to the main body, and the light source supporting member is prevented from being separated from the housing when the insertion part is inserted in the insertion accommodating part and rotated at a predetermined angle.

In an exemplary embodiment, a coupling protrusion is provided in the bottom surface of the housing and a coupling groove is provided in one side of the main body that faces the housing. The coupling groove is coupled to the coupling protrusion when the light source supporting member is rotated.

In an exemplary embodiment, the insertion accommodating part includes a coupling through hole corresponding to a section of the insertion part, and the coupling protrusion is disposed in opposite sides of the coupling through hole.

In an exemplary embodiment, the light source supporting member further includes a downwardly-bent elastic bent part in a side of the main body in order to prevent the light source supporting member from moving due to an external impact.

In an exemplary embodiment, the connecting part has a cross-section smaller than a cross-section of the engagement part, and the engagement part tapers in a direction toward the housing.

In an exemplary embodiment, the engagement part has one of a fanwise section and a polygonal section.

In an exemplary embodiment, the light source part includes one of a CCFL (cold cathode fluorescent lamp) and an EEFL (external electrode fluorescent lamp).

In an exemplary embodiment, the display device further includes an optical member interposed between the light source part and the liquid crystal display panel. The light source supporting member further includes an optical member supporting part protruding from the main body toward the liquid crystal display panel to support the optical member.

In an exemplary embodiment, a reflecting layer is formed in at least one region of the light source supporting member in order to enhance light efficiency.

In an exemplary embodiment, the display device further includes a reflecting sheet interposed between the housing and the light source part and the reflecting layer is made of the same material as the reflecting sheet.

In an exemplary embodiment, the reflecting sheet is formed with a first through hole corresponding to a section of the insertion part and a second through hole corresponding to the coupling protrusion.

In an exemplary embodiment, a gap between the main body and the engagement part is substantially equal to a thickness of the housing plus a thickness of the reflecting sheet. Parts of the housing and the reflecting sheet are inserted between the main body and the engagement part when the light source supporting member is rotated.

An exemplary embodiment provides a light source supporting member including a planar main body, a light source holder extending from a top side of the main body, and an insertion part protruding from a bottom side of the main body. The insertion part includes an engagement part having a non-circular section and a connecting part connecting the engagement part to the main body.

In an exemplary embodiment, the light source supporting member further includes an optical member supporting part protruding from the top side of the main body.

In an exemplary embodiment, a downwardly-bent elastic bent part is provided in the bottom side of the main body.

In an exemplary embodiment, a coupling groove is provided in the bottom side of the main body.

In an exemplary embodiment, a reflecting layer is formed in at least one region of the main body, the light source holder and the sheet supporting part.

In an exemplary embodiment, the connecting part has a section smaller than the engagement part, and the engagement part tapers toward the bottom side of the main body.

An exemplary embodiment provides a method of coupling a light source supporting member to a housing of a liquid crystal display ("LCD") device. The method includes pressing the light source supporting member toward the housing, the light source supporting member including a main body and an insertion part protruding downward from the main body, inserting the insertion part through a first hole in a reflection sheet and into an accommodating part of the housing, the reflection sheet being interposed between the housing and the light source supporting member and the insertion part protrudes from a bottom of the housing and rotating the light source supporting member such that a coupling groove in the light source supporting member engages with a coupling protrusion of the housing. A portion of the reflecting sheet and the bottom of the housing are inserted between the engagement part and the main body when the light source supporting member is rotated.

BRIEF DESCRIPTION OF THE DRAWINGS

The above and/or other aspects and advantages of the prevent invention will become apparent and more readily appreciated from the following description of the exemplary embodiments, taken in conjunction with the accompany drawings, in which.

DETAILED DESCRIPTION OF THE INVENTION

Figure 1:
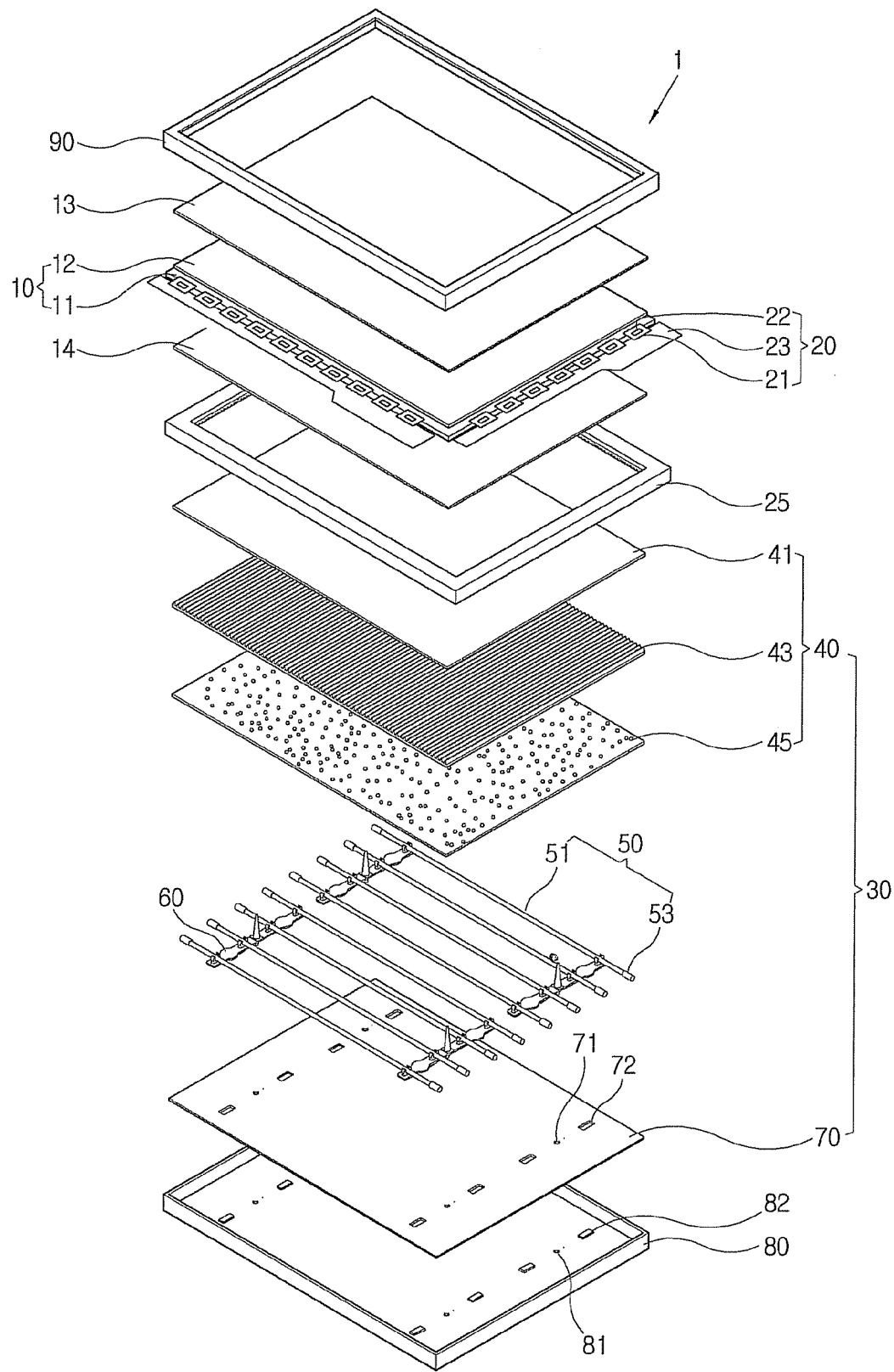
FIG. 1 is an exploded perspective view illustrating an exemplary embodiment of an LCD device according to the present invention.

Reference will now be made in detail to the embodiments of the present invention, examples of which are illustrated in the accompanying drawings, wherein like reference numerals refer to like elements throughout. The embodiments are described below so as to explain the present invention by referring to the figures. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "below", "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "lower" relative to other elements or features would then be oriented "upper" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Figure 2:
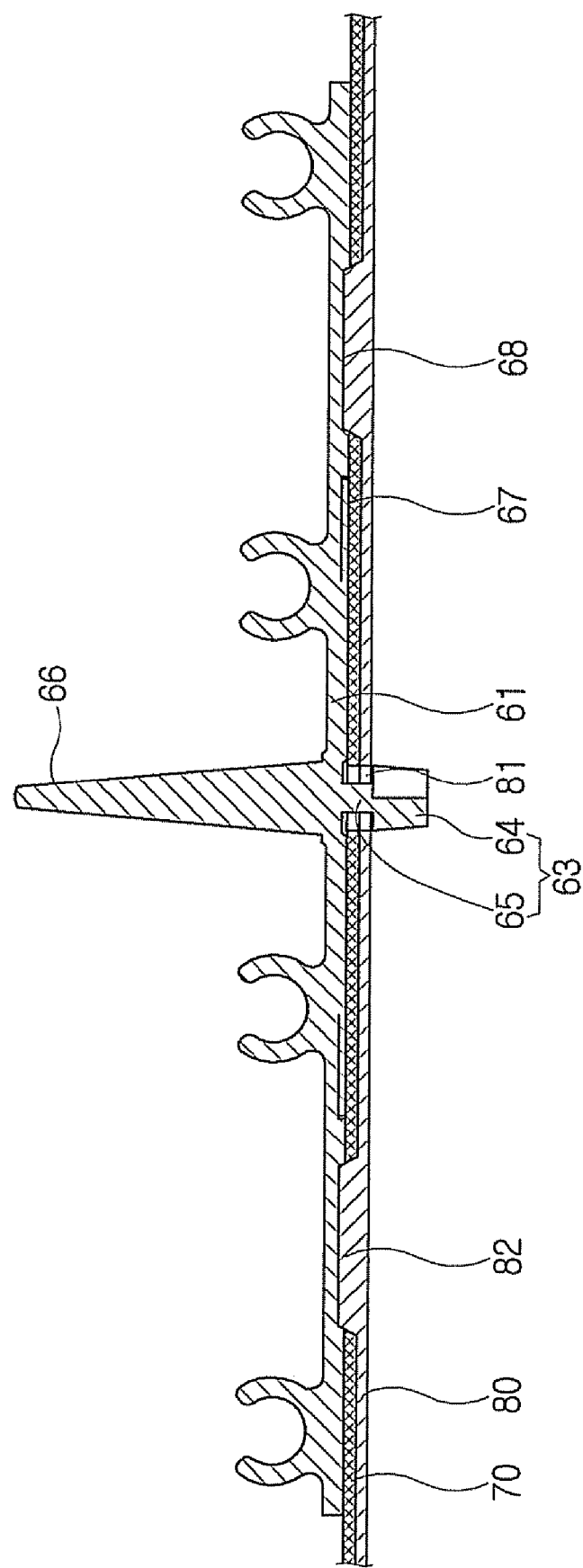
FIG. 2 is a cross-sectional view illustrating an exemplary embodiment of a main part of the LCD device in FIG. 1.
Figure 3:
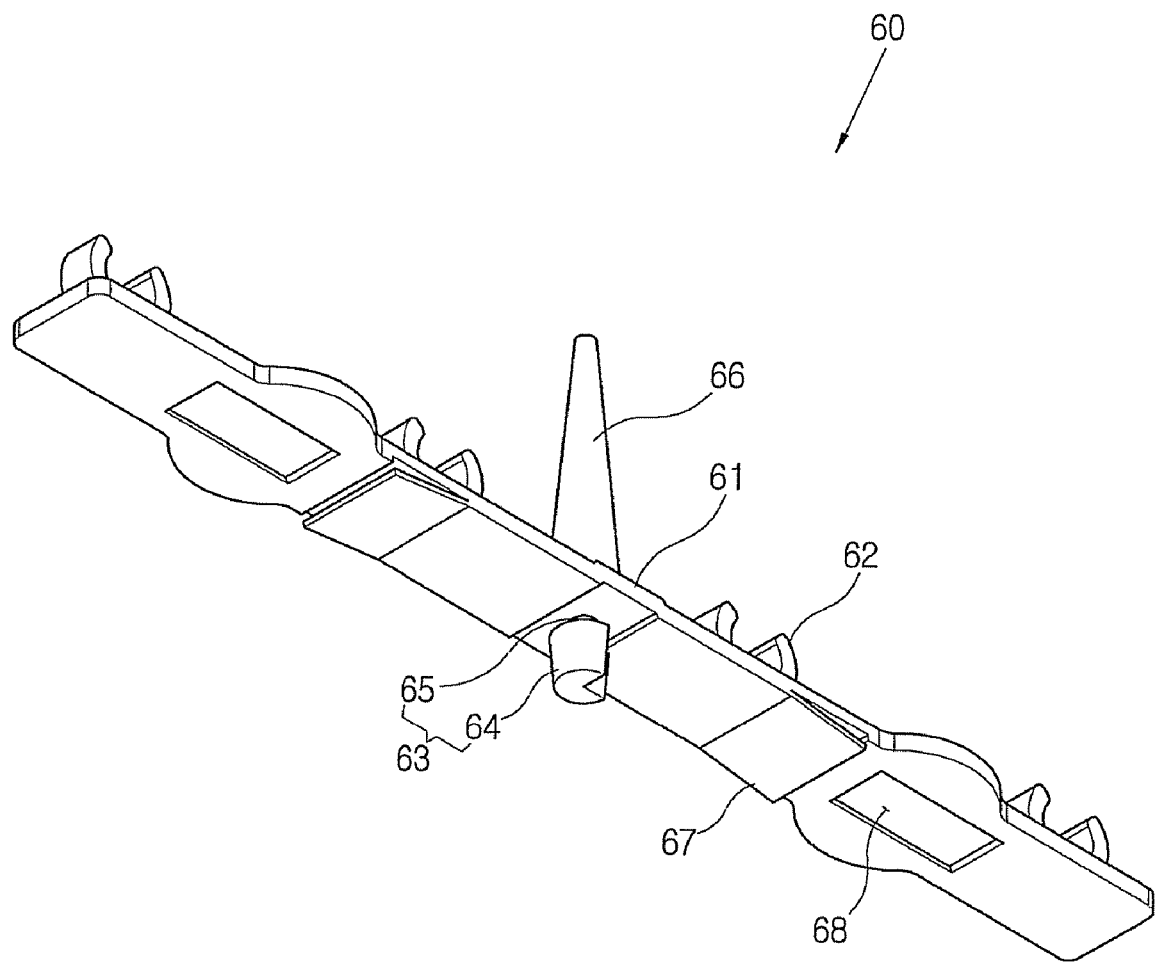
FIG. 3 is a perspective view illustrating an exemplary embodiment of a light source supporting member in the LCD device in FIG. 1.

As show in FIGS. 1 to 3, a liquid crystal display device 1 includes an LCD panel 10 on which images are displayed, a driving part 20 driving the LCD panel 10, a mold frame 25 supporting a circumference around the LCD panel 10, a backlight unit 30 emitting light to a rear side of the LCD panel 10, a housing 80 accommodating the backlight unit 30 and supporting the mold frame 25, and a front cover 90 coupled with the housing 80 and covering the front side of the LCD panel 10.

The LCD panel 10 includes a TFT substrate 11, a color filter substrate 12 oppositely attached to the TFT substrate 11 and a liquid crystal layer (not shown) interposed therebetween. The LCD panel 10 further includes polarizing plates 13 and 14, which are respectively attached to the front side of the color filter substrate 12 and the rear side of the TFT substrate 11 to cross-polarize light transmitting through the LCD panel 10. The LCD panel 10 is provided with liquid crystal cells arranged in the form of a matrix to form pixels, and controls the light transmittance of the respective liquid crystal cells to form images, based on an image signal inputted from the driving part 20.

In the thin film transistor substrate 11, a plurality of gate lines and a plurality of data lines are formed to have a matrix shape, and TFTs are formed at intersections of the gate lines and the date lines. A signal voltage supplied from the driving part 20 is applied between a pixel electrode and a common electrode, which is provided to the color filter substrate 12, through a TFT. Liquid crystal between the pixel electrode and the common electrode is arranged to determine the light transmission according to the signal voltage.

The color filter substrate 12 includes color filters and the common electrode. In exemplary embodiments, the color filter may be repetitively formed with red, green and blue colors, or cyan, magenta and yellow colors, partitioned by black matrixes. The common electrode may be formed of a transparent conductive material such as ITO (indium tin oxide), IZO (indium zinc oxide) or the like. The color filter substrate 12 may have an area smaller than the TFT substrate 11.

The front polarizing plate 13 and the rear polarizing plate 14 are disposed to obtain cross-polarized light. The rear polarizing plate 14 polarizes light incident into the liquid crystal panel 10 and the front polarizing plate 13 serves as an analyzer.

The driving part 20 supplying a driving signal is provided to one side of the TFT substrate 11. The driving part 20 includes an FPC (flexible printed circuit) board 21, a driving chip 22 mounted on the FPC board 21 and a PCB (printed circuit board) 23 connected to the FPC board 21. In the illustrated embodiment, the driving part 20 is provided as a COF (chip on film). In alternative embodiments, the driving part 20 may be provided as a TCP (tape carrier package) or a COG (chip on glass).

The driving part 20 may also be formed on the TFT substrate 11 in the process of forming wire lines. The driving part 20 includes terminals, which are mounted on the TFT substrate 11 and are electrically connected with ends of gate lines and data lines of the thin film transistor substrate 11, which extend from a display region to a non-display region on the TFT substrate 11.

The mold frame 25 is formed along a periphery of the LCD panel 10 and has a substantially quadrangular shape. The mold frame 25 supports the LCD panel 10 with a gap between the LCD panel 10 and the backlight unit 30.

The backlight unit 30 includes an optical member 40, such as an optical sheet assembly, disposed substantially in parallel to the rear side of the LCD panel 10, a light source unit 50 and 60 provided with a light source part 50 emitting light to the rear side of the LCD panel 10 through the optical sheet assembly 40 and a light source supporting member 60 coupled to the housing 80 and supporting the light source part 50, and a reflecting sheet 70 interposed between the light source part 50 and the housing 80 for reflecting light emitted from the light source part 50 uniformly toward the rear side of the liquid crystal panel 10.

The optical sheet assembly 40 includes a passivation layer 41, a prism sheet 43, and a diffusing sheet 45, which are disposed below the liquid crystal panel 10. The diffusing sheet 45 may include a base plate and an uneven coating layer formed in the base plate. The diffusing sheet 45 diffuses light from a light source 51 to the LCD panel 10. The diffusing sheet 45 may include two or three overlapped sheets.

The prism sheet 43 may includes a plurality of triangular prisms regularly arranged on an upper side of the prism sheet 43. The prism sheet 43 concentrates the diffused light in a direction perpendicular to the LCD panel 10. The prism sheet 43 may include two sheets, each of which has micro prisms formed with a predetermined angle thereon. Light passing through the prism sheet 43 is mostly supplied to the LCD panel 10 to provide a uniform brightness distribution.

The passivation layer 41 located on the prism sheet 43 protects the prism sheet 43 which is apt to be scratched.

Each of a plurality of light source parts 50 includes the light source 51 for emitting light and a light source electrode 53 provided at an end of the light source 51. The plurality of light source parts 50 is supplied with electrical power from an inverter (not shown). The plurality of light source parts 50 are arranged substantially in parallel to each other across all of the LCD panel 10.

In exemplary embodiments, the light source part 50 may be provided with a CCFL (cold cathode fluorescent lamp), or an EEFL (external electrode fluorescent lamp) which has high brightness, low product cost and low power consumption and enables one inverter to drive a plurality of the light sources. In an alternative embodiment, the light source part 50 may be provided with an FFL (flat fluorescent lamp) having a planar shape and generating uniform light without thickness. In comparison with other known light sources, the FFL has high brightness, superior brightness uniformity, low power consumption and superior durability.

Referring to FIGS. 2 and 3, the light source supporting member 60 includes a planar main body 61, a light source holder 62 extending from the main body 61 (e.g., from an upper surface) toward the light source part 50 to support the light source part 50, an insertion part 63 protruding from the main body 61 toward the housing 80 to be coupled with an insertion accommodating part 81, and an optical member supporting part 66 protruding from the main body 61 toward the LCD panel 10 to support the optical sheet assembly 40. Elastic bent parts 67 are provided at one side (e.g., a lower side) of the main body 61 and are bent toward the housing 80. Coupling grooves 68 are provided adjacent to the elastic bent parts 67, respectively.

The main body 61 covers the insertion accommodating part 81 while surface-contacting with the reflecting sheet 70 provided in the housing 80. The sheet supporting part 66 protrudes from a central part of the main body 61 toward the LCD panel 10 to support the optical sheet assembly 40.

The light source holders 62 are respectively disposed at the opposite sides of the main body 61 relative to the optical member supporting part 66. The light source holders 62 protrude upwardly from an upper surface of the main body 61. The sheet supporting part 66 reduces or effectively prevents the optical sheet assembly 40 from sagging. The light source holder 62 surrounds a circumference of the light source 51 to stably support the light source part 50 against an external impact.

The insertion part 63 is provided at the rear side of the main body 61 to correspond to the sheet supporting part 66. The insertion part 63 may be considered as corresponding substantially in shape, size or positional placement relative to the sheet supporting part 66.

The insertion part 63 includes an engagement part 64 having a non-circular section and a connecting part 65 interconnecting the engagement part 64 and the main body 61. Referring to FIG. 3, the engagement part 64 may have a fanwise section and may taper in diameter in a direction toward the housing 80. A cross-section of the connecting part 65 is smaller than that of the engagement part 64.

A predetermined gap is formed between the engagement part 64 and the main body 61 in a direction substantially perpendicular to the main body 61. The width of the gap may be substantially equal to the thickness of the housing 80 plus the thickness of the reflecting sheet 70. When the insertion part 63 is inserted in the insertion accommodating part 81, and then the light source supporting member 60 is rotated at a predetermined angle about an axis perpendicular to the LCD panel 10, parts of the reflecting sheet 70 and the housing 80 are inserted (or captured) between the engagement part 64 and the main body 61, thereby preventing the light source supporting member 60 from being separated from the housing 80.

The elastic bent parts 67, which are provided at the rear side of the main body 61, push the main body 61 in a direction away from the housing 80. The main body 61 is formed with a recess part recessed at a predetermined depth to correspond to the elastic bent part 67. Accordingly, when the light source supporting member 60 is coupled to the housing 80, the main body 61 can contact with the reflecting sheet 70. In an alternative embodiment, the recess part may be omitted. Advantageously, even when an external impact is applied to the LCD device 1, shaking of the light source supporting member 60 may be reduced or effectively prevented due to a buffering action of the elastic bent part 67.

The coupling grooves 68 are provided on the rear side of the main body 61. The coupling grooves 68 are respectively coupled to coupling protrusions 82 provided in the bottom of the housing 80 when the light source supporting member 60 is rotated. Advantageously, movement in all directions of the light source supporting member 60 can be reduced or effectively prevented, thereby fixing the light source supporting member 60.

As in the illustrated embodiment, even when an external impact is applied to the LCD device 1, the light source supporting member 60 can be stably coupled to the housing 80 without moving, thereby stably supporting the light source part 60. Vibration and noise of the LCD device 1 caused by movement of the light source supporting member 60 may be minimized. Advantageously, the light source supporting member 60 can be simply coupled with the housing 80 by inserting and rotating the insertion part 63 in the insertion accommodating part 81, thereby reducing time taken for an assembly process and facilitating automation of the assembly process.

Returning to FIG. 1, the reflecting sheet 70 interposed between the light source part 50 and the housing 80 reflects light from the light source part 50 toward the diffusing sheet 45. In exemplary embodiments, the reflecting sheet 70 may be made of PET (poly ethylene terephthalate), PC (poly carbonate) or the like. The reflecting sheet 70 is attached to a bottom surface of the housing 80. The reflecting sheet 70 includes first through holes 71, which are positioned to correspond to the insertion accommodating part 81 and have a shape corresponding to the insertion part 63. Also, the reflecting sheet 70 is provided with second through holes 72 corresponding to the coupling protrusion 82, which will be described later. The second through holes 72 may be considered as corresponding substantially in shape, size or positional placement relative to the coupling protrusion 82.

In the bottom surface of the housing 80 are provided a plurality of insertion accommodating parts 81 to which the insertion part 63 is inserted. The insertion accommodating parts 81 may be provided as coupling through holes having a shape corresponding to the cross-section of the insertion part 63.

The coupling protrusions 82 are formed in opposing sides of the insertion accommodating part 81 in the bottom surface of the housing 80. The coupling protrusions 82 penetrate the second through hole 72 of the reflecting sheet 70 to be exposed externally when the reflecting sheet 70 is assembled on the housing 80 as illustrated in FIG. 2. The coupling protrusions 82 are coupled to the coupling grooves 68 of the light source supporting member 60 to reduce or effectively prevent the light source supporting member 60 from moving.

In an alternative exemplary embodiment, the reflecting sheet 70 may be provided with protrusion parts to correspond to the coupling protrusions 82. The coupling protrusions 82 are not exposed externally, and instead, the protrusion parts of the reflecting sheet 70 are coupled to the coupling grooves 68. The coupling grooves 68 have a size corresponding to the reflection sheet 70 protrusion parts for firm coupling therebetween.

The front cover 90 includes a display window externally exposing an effective area of the LCD panel 10 and is coupled to the housing 80 to accommodate the mold frame 25.

Hereinafter, an exemplary embodiment of a method of coupling the light source supporting member 60 to the housing 80 will be described by referring to FIGS. 4a to 5b.

Figure 4A:
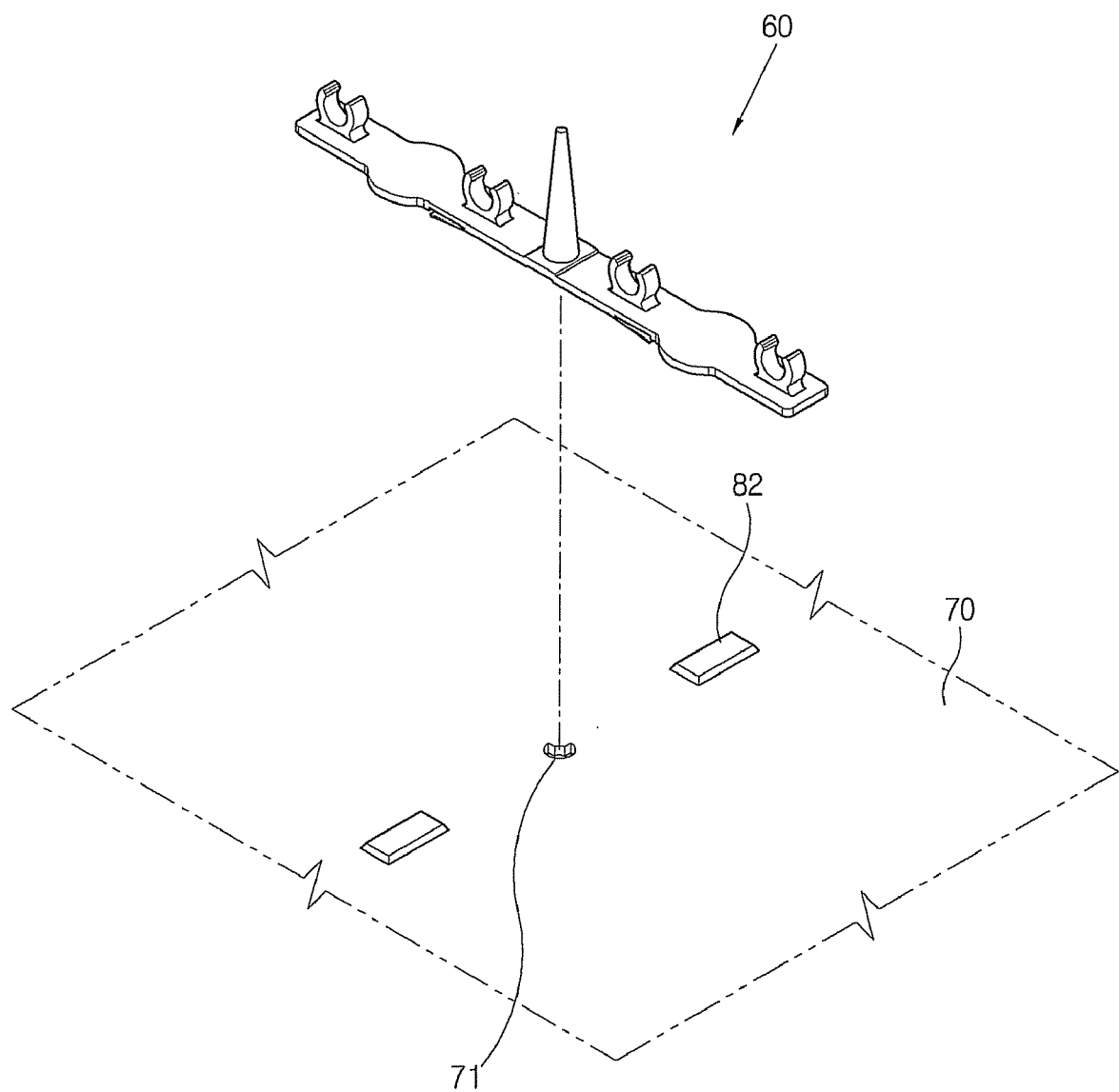
FIGS. 4a to 5b illustrate an exemplary embodiment of a method of coupling the light source supporting member to a housing in the LCD device in FIG. 1.
Figure 4B:
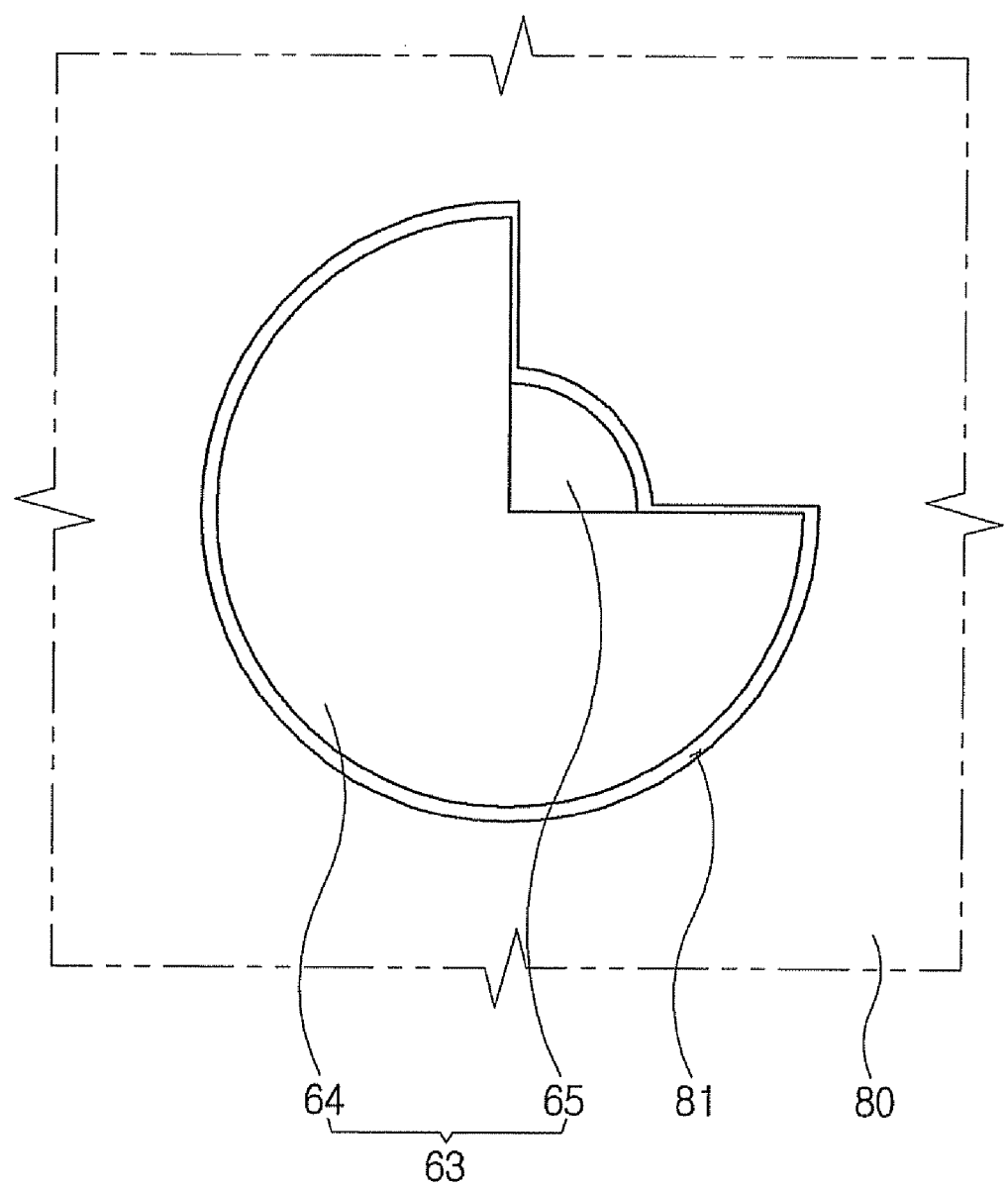

As shown in FIGS. 4a and 4b, at first, when the light source supporting member 60 is pressed toward the housing 80, the insertion part 63 is inserted in the insertion accommodating part 81 through the first through hole 71 of the reflecting sheet 70. The engagement part 64 downwardly protrudes from the housing 80. In an exemplary embodiment, the first through hole 71 and the insertion accommodating part 81 may have the substantially same size as the cross-section of the engagement part 64 or a size slightly larger than the section of the engagement part 64 so that the insertion part 63 is inserted therethrough with little or no difficulty.

Figure 5A:
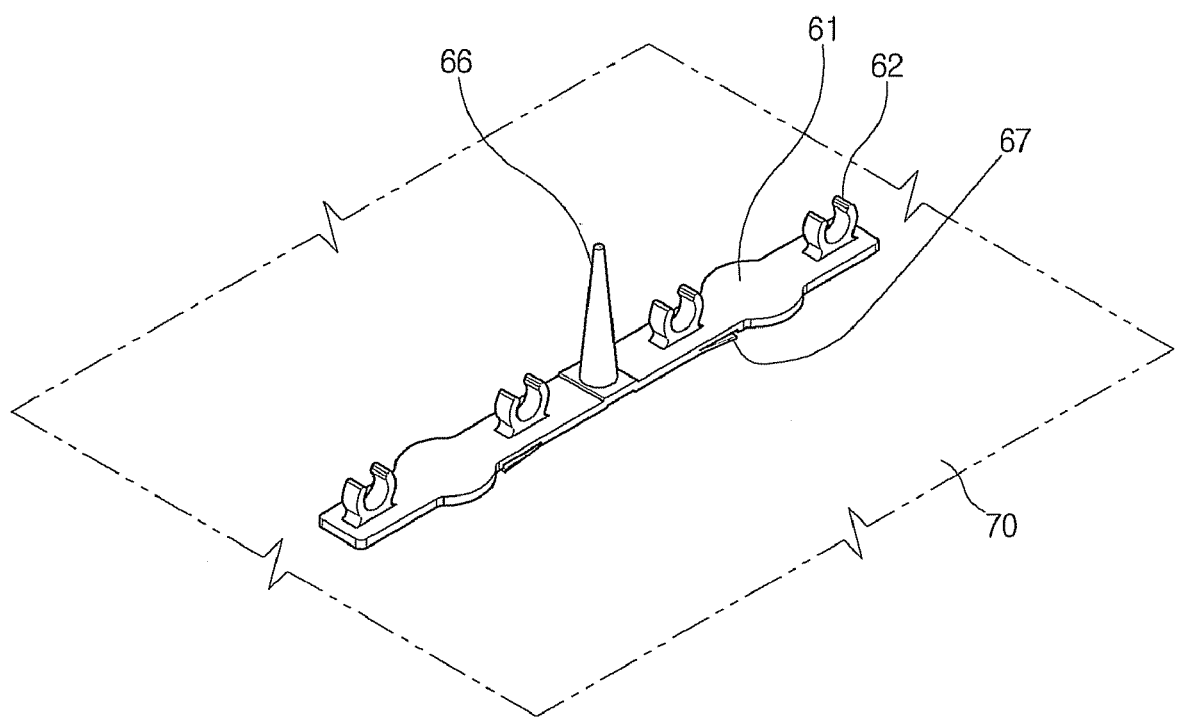
Figure 5B:
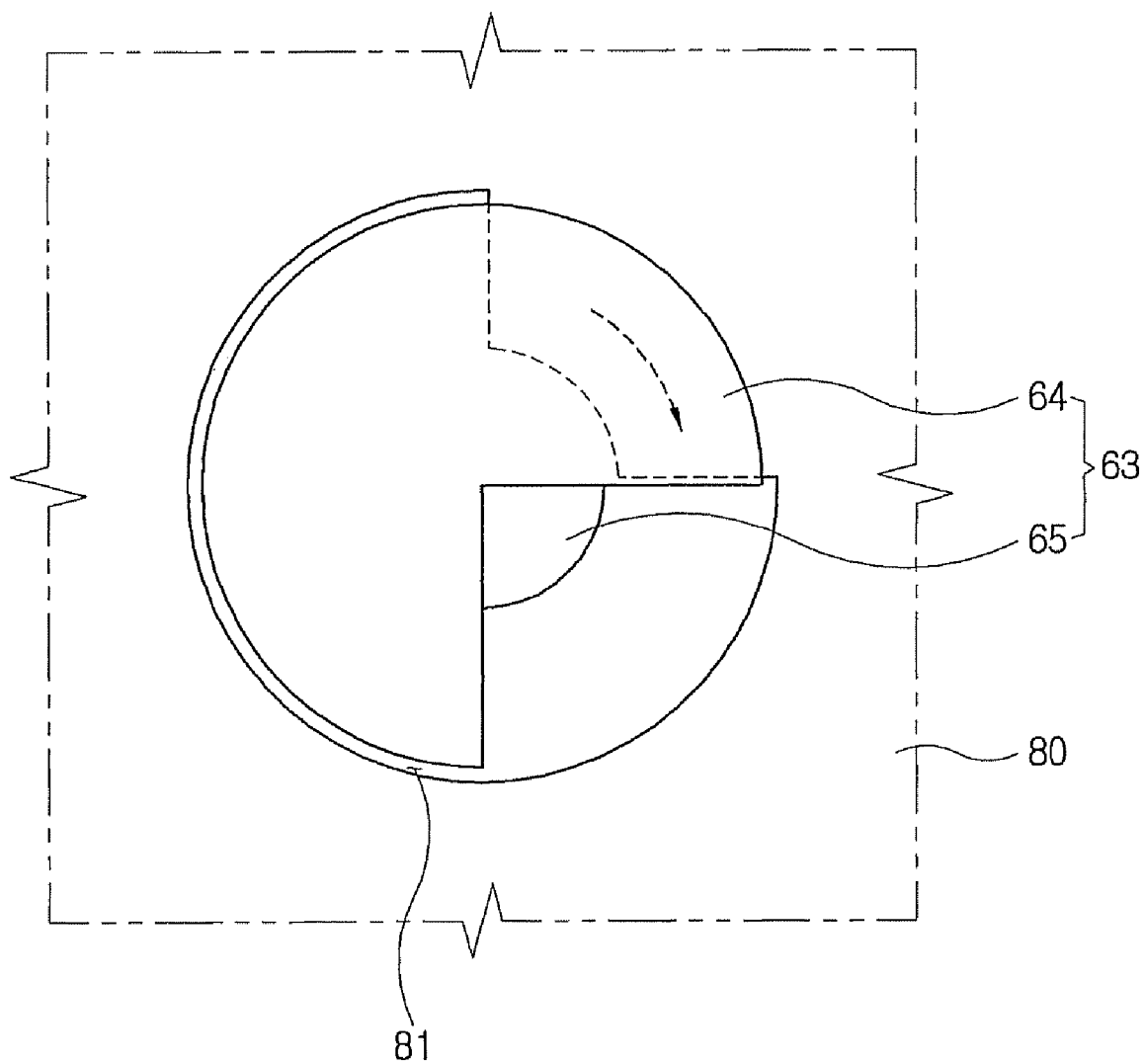

As shown in FIGS. 5a and 5b, the light source supporting member 60 is rotated clockwise or counterclockwise so that the coupling groove 68 (see FIG. 1) is coupled to the coupling protrusion 82 (see FIGS. 1 and 2). Thus, parts of the reflecting sheet 70 and the housing 80 are inserted between the engagement part 64 and the main body 61 (see also FIG. 2). Advantageously, the light source supporting member 60 can be simply and stably coupled to the housing 80, thereby reducing or effectively preventing the light source supporting member 60 from seceding from the housing 80.

Hereinafter, another exemplary embodiment of an LCD device according to the present invention will be described by referring to FIG. 6.

Figure 6:
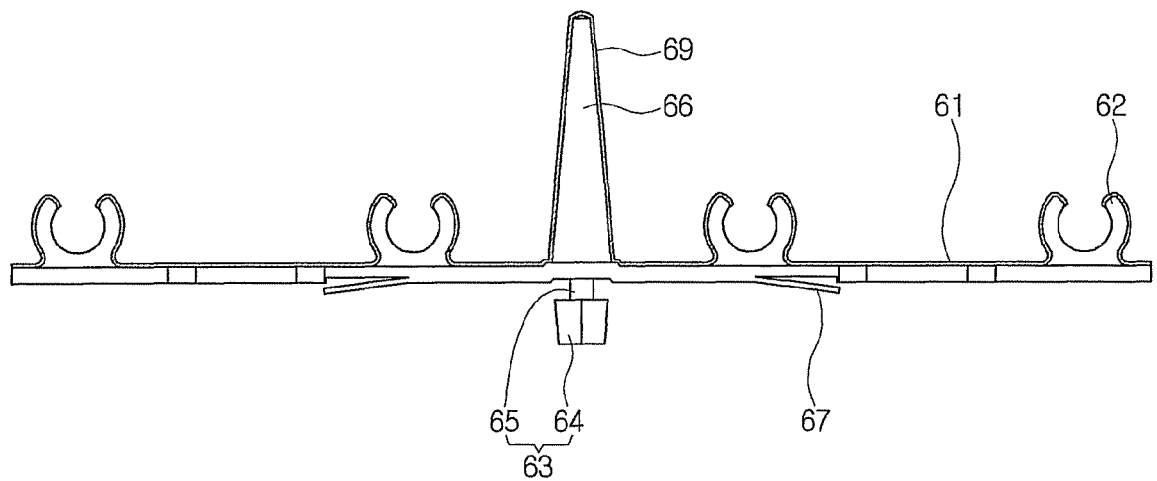
FIG. 6 is a cross-sectional view illustrating another exemplary embodiment of a light source supporting member of an LCD device according to the present invention.

As shown in FIG. 6, a reflecting layer 69 is formed on at least one region of the light source supporting member 60. The reflecting layer 69 is formed on an upper surface of the main body 61, an outer surface of the light source holder 62 and a surface of the sheet supporting part 66. The reflecting layer 69 is not formed on an inner surface of the light source holder 62. Thus, light from the light source part 50 can be maximally reflected, thereby enhancing light efficiency. In exemplary embodiments, the reflecting layer 69 is made of the same material as the reflecting sheet 70 to maximize reflection uniformity and brightness.

Hereinafter, another exemplary embodiment of an LCD device according to the present invention will be described by referring to FIG. 7.

Figure 7:
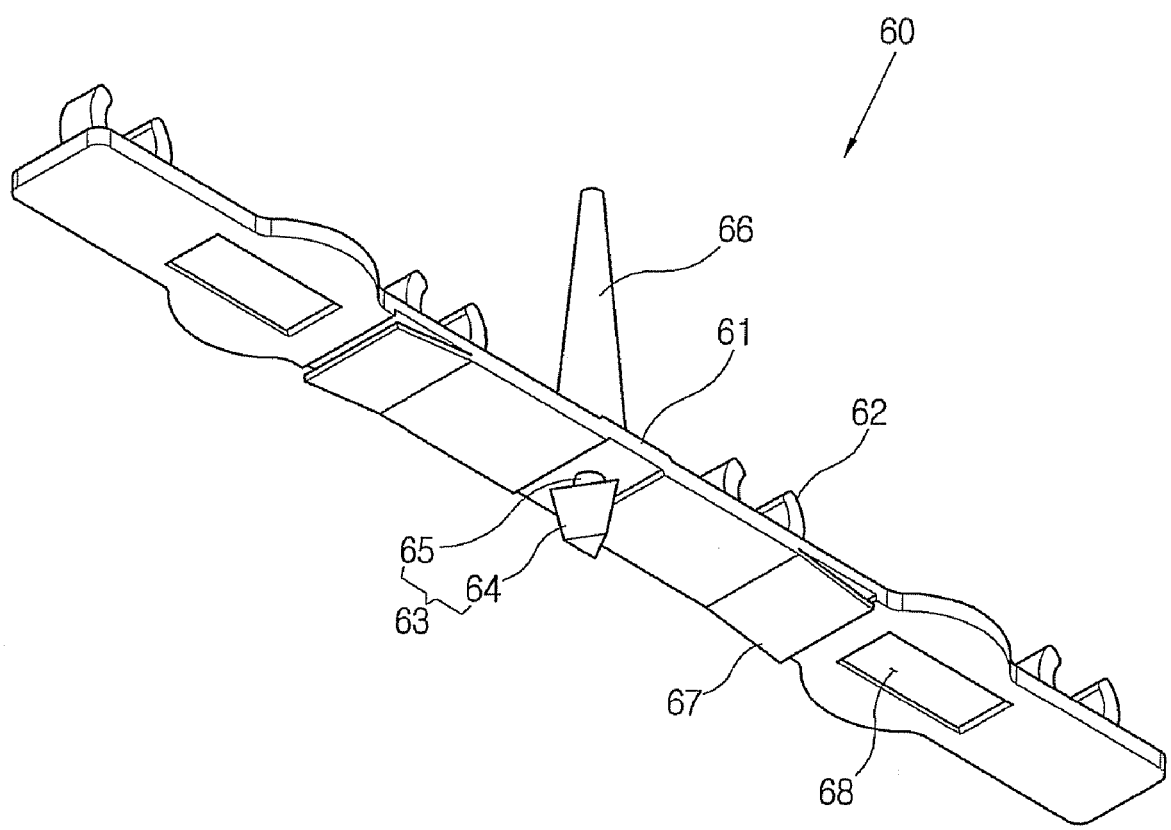
FIG. 7 is a perspective view illustrating a light source supporting member of another exemplary embodiment of an LCD device according to the present invention.

As shown in FIG. 7, an engagement part 64 may have a triangular section. Also, a first through hole 71 of a reflecting sheet 70 and an insertion accommodating part 81 of a housing 80 are formed to correspond to the triangular section of an engagement part 64.

In alternative embodiments, the engagement part 64 may have a polygonal section such as a quadrangular section, a pentagonal section or the like, such as is suitable for the purpose of securing the light source supporting member 60 to the housing 80.

The light source supporting members as in the illustrated embodiments can be applied to display devices of other types as well as the direct-light type liquid crystal display device as long as they can secure the light source part.

The illustrated embodiments provide a light source supporting member and a display device including the same, which can simply be assembled and stably support a light source part.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display device comprising:
a liquid crystal display panel;
a light source unit disposed behind the liquid crystal display panel and comprising:
a light source part supplying light to the liquid crystal display panel; and
a light source supporting member supporting the light source part; and
a housing accommodating the light source unit and including an insertion accommodating part having a non-circular section being provided in a bottom surface of the housing,
wherein the light source supporting member comprises:
a planar main body;
a light source holder extending from the main body toward the light source part and supporting the light source part;
an insertion part protruding from the main body toward the housing and coupled to the insertion accommodating part, and
a coupling groove provided in one side of the main body that faces the housing; and
wherein the insertion part comprises;
an engagement part corresponding to the insertion accommodating part; and
a connecting part connecting the engagement part to the main body, wherein the light source supporting member is prevented from being separated from the housing when the insertion part is inserted in the insertion accommodating part and rotated at a predetermined angle.

2. The display device according to claim 1,
wherein the housing further includes a coupling protrusion in the bottom surface of the housing; and
wherein the coupling groove is coupled to the coupling protrusion when the light source supporting member is rotated.

3. The display device according to claim 2, wherein the insertion accommodating part comprises a coupling through hole corresponding to a section of the insertion part, and
wherein the coupling protrusion is disposed on opposing sides of the coupling through hole.

4. The display device according to claim 1, wherein the light source supporting member further comprises a downwardly-bent elastic bent part in a side of the main body facing the housing.

5. The display device according to claim 4, wherein the connecting part has a cross-section smaller than the engagement part, and
wherein the engagement part tapers toward the housing.

6. The display device according to claim 4, wherein the engagement part has a fanwise cross-section.

7. The display device according to claim 4, wherein the engagement part has a polygonal cross-section.

8. The display device according to claim 4, wherein the light source part comprises one of a CCFL (cold cathode fluorescent lamp) and an EEFL (external electrode fluorescent lamp).

9. The display device according to claim 4, further comprising an optical member interposed between the light source part and the liquid crystal display panel,
wherein the light source supporting member further comprises an optical member supporting part protruding from the main body toward the liquid crystal display panel and supporting the optical member.

10. The display device according to claim 9, wherein a reflecting layer is formed in at least one region of the light source supporting member.

11. The display device according to claim 10, further comprising a reflecting sheet interposed between the housing and the light source part,
wherein the reflecting layer is made of the same material as the reflecting sheet.

12. The display device according to claim 2, further comprising a reflecting sheet interposed between the housing and the light source part,
wherein the reflecting sheet is formed with a first through hole corresponding to a cross-section of the insertion part and a second through hole corresponding to the coupling protrusion.

13. The display device according to claim 11, wherein a gap between the main body and the engagement part is substantially equal to a thickness of a bottom of the housing plus a thickness of the reflecting sheet, and wherein parts of the housing and the reflecting sheet are inserted between the main body and the engagement part when the light source supporting member is rotated.

14. The display device according to claim 2, wherein the light source supporting member further comprises at least one downwardly-bent elastic bent part in a side of the main body facing the housing.

15. The display device according to claim 14, wherein the connecting part has a cross-section smaller than a cross-section of the engagement part, and the engagement part tapers toward the housing.

16. The display device according to claim 14, wherein the engagement part has one of a fanwise section and a polygonal section.

17. The display device according to claim 14, wherein the light source part comprises one of a CCFL (cold cathode fluorescent lamp) and an EEFL (external electrode fluorescent lamp).

18. The display device according to claim 2, further comprising an optical member interposed between the light source part and the liquid crystal panel, wherein the light source supporting member further comprises an optical member supporting part protruding from the main body toward the liquid crystal panel and supporting the optical member.

19. The display device according to claim 18, wherein a reflecting layer is formed in at least one region of the light source supporting member.

20. The display device according to claim 19, further comprising a reflecting sheet interposed between the housing and the light source part, wherein the reflecting layer is made of the same material as the reflecting sheet.

21. The display device according to claim 20, wherein the reflecting sheet is formed with a first through hole corresponding to a cross-section of the insertion part and a second through hole corresponding to the coupling protrusion.

22. The display device according to claim 20, wherein a gap between the main body and the engagement part is substantially equal to a thickness of a bottom of the housing plus a thickness of the reflecting sheet, and wherein parts of the housing and the reflecting sheet are inserted between the main body and the engagement part when the light source supporting member is rotated.

23. A light source supporting member comprising:
a planar main body;
a light source holder extending from a top side of the main body;
an insertion part protruding from a bottom side of the main body, and
a coupling groove provided in the bottom side of the main body,
wherein the insertion part comprises an engagement part having a non-circular section and a connecting part connecting the engagement part to the main body.

24. The light source supporting member according to claim 23, further comprising a sheet supporting part protruding from the top side of the main body.

25. The light source supporting member according to claim 23, further comprising a downwardly-bent elastic bent part in the bottom side of the main body.

26. The light source supporting member according to claim 24, further comprising a reflecting layer formed in at least one region of the main body, the light source holder and the sheet supporting part.

27. The light source supporting member according to claim 25, wherein the connecting part has a cross-section smaller than a cross-section the engagement part, and wherein the engagement part tapers in a direction away from the bottom side of the main body.

28. A method of coupling a light source supporting member to a housing of an liquid crystal display ("LCD") device, the method comprising:
pressing the light source supporting member toward the housing, the light source supporting member including a main body and an insertion part protruding downward from the main body;
inserting the insertion part through a first hole in a reflection sheet and into an accommodating part of the housing, wherein the reflection sheet is interposed between the housing and the light source supporting member and the insertion part protrudes from a bottom of the housing; and
rotating the light source supporting member such that a coupling groove in the light source supporting member engages with a coupling protrusion of the housing;
wherein a portion of the reflecting sheet and the bottom of the housing are inserted between the engagement part and the main body.

29. The method according to claim 28, wherein the inserting the insertion part includes inserting the coupling protrusion through a second hole in the reflecting sheet.

* * * * *